(12) United States Patent
Sawaki

(10) Patent No.: US 7,580,780 B2
(45) Date of Patent: Aug. 25, 2009

(54) VEHICLE CONTROLLER

(75) Inventor: Masaru Sawaki, Niwa-gun (JP)

(73) Assignee: DENSO CORPORATION, Kariya (JP)

( * ) Notice: Subject to any disclaimer, the term of this patent is extended or adjusted under 35 U.S.C. 154(b) by 286 days.

(21) Appl. No.: 11/448,811

(22) Filed: Jun. 8, 2006

(65) Prior Publication Data

US 2006/0293844 A1 Dec. 28, 2006

(30) Foreign Application Priority Data

Jun. 20, 2005 (JP) .............................. 2005-179727
Apr. 3, 2006 (JP) .............................. 2006-102398

(51) Int. Cl.
*G01C 22/00* (2006.01)

(52) U.S. Cl. .................. 701/27; 701/209; 701/210; 340/995.2

(58) Field of Classification Search .............. 701/27, 701/207, 208, 209, 210; 340/995.2, 988
See application file for complete search history.

(56) References Cited

U.S. PATENT DOCUMENTS

| | | | | |
|---|---|---|---|---|
| 4,964,052 | A * | 10/1990 | Ohe | 701/208 |
| 5,046,011 | A * | 9/1991 | Kakihara et al. | 701/209 |
| 5,109,344 | A * | 4/1992 | Kakihara et al. | 701/209 |
| 5,155,491 | A * | 10/1992 | Ando | 342/357.15 |
| 5,434,788 | A * | 7/1995 | Seymour et al. | 701/207 |
| 5,469,360 | A * | 11/1995 | Ihara et al. | 701/208 |
| 5,552,990 | A * | 9/1996 | Ihara et al. | 701/208 |
| 5,564,650 | A * | 10/1996 | Tucker et al. | 244/3.17 |
| 5,642,106 | A * | 6/1997 | Hancock et al. | 340/988 |
| 5,852,791 | A * | 12/1998 | Sato et al. | 701/217 |
| 5,902,350 | A * | 5/1999 | Tamai et al. | 701/211 |
| 5,904,728 | A * | 5/1999 | Tamai et al. | 701/211 |
| 5,961,571 | A * | 10/1999 | Gorr et al. | 701/207 |
| 6,023,653 | A * | 2/2000 | Ichimura et al. | 701/208 |
| 6,049,749 | A * | 4/2000 | Kobayashi | 701/49 |
| 6,064,925 | A * | 5/2000 | Kobayashi et al. | 701/23 |
| 6,108,603 | A * | 8/2000 | Karunanidhi | 701/208 |
| 6,223,124 | B1 * | 4/2001 | Matsuno et al. | 701/209 |
| 6,226,591 | B1 * | 5/2001 | Okumura et al. | 701/216 |
| 6,253,154 | B1 * | 6/2001 | Oshizawa et al. | 701/221 |

(Continued)

FOREIGN PATENT DOCUMENTS

JP A-04-213019 8/1992

(Continued)

OTHER PUBLICATIONS

Hahn, S., "Switching Between Autonomous And Conventional Car Driving A Simulator Study," Intelligent Vehicles '93 Symposium, vol., no., pp. 25-30, Jul. 14-16, 1993 URL: http://ieeexplore.ieee.org/stamp/stamp.jsp?arnumber=697292&isnumber=7467.*

*Primary Examiner*—Mark Hellner
(74) *Attorney, Agent, or Firm*—Posz Law Group, PLC

(57) ABSTRACT

A vehicle position detector in a vehicle on a road leading to a junction predictably evaluates road attributes for determining false map matching possibility before the vehicle actually reaches the junction. The evaluation is based on, for example, an attribute such as a direction of the road, an incline of the road or the like. The position of the vehicle in association with the traveling road in a map matching process is stochastically determined and is used for controlling the vehicle.

5 Claims, 3 Drawing Sheets

U.S. PATENT DOCUMENTS

| | | | |
|---|---|---|---|
| 6,317,683 B1 * | 11/2001 | Ciprian et al. | 701/118 |
| 6,466,866 B1 * | 10/2002 | Sato | 701/209 |
| 6,502,033 B1 * | 12/2002 | Phuyal | 701/214 |
| 6,597,986 B2 * | 7/2003 | Mikame | 701/211 |
| 6,609,817 B2 | 8/2003 | Niwa et al. | |
| 7,124,027 B1 * | 10/2006 | Ernst et al. | 701/301 |
| 7,409,295 B2 * | 8/2008 | Paradie | 701/301 |
| 2001/0056326 A1 * | 12/2001 | Kimura | 701/208 |
| 2005/0171688 A1 * | 8/2005 | Fujita et al. | 701/201 |

FOREIGN PATENT DOCUMENTS

| | | |
|---|---|---|
| JP | A-08-029189 | 2/1996 |
| JP | A-2001-182817 | 7/2001 |

* cited by examiner

DIFFERENCE OF HORIZONTAL ANGLES OF $V_{An}$ AND $V_{Bn}$ : $Vh\theta_n$
DIFFERENCE OF VERTICAL ANGLES OF $V_{An}$ AND $V_{Bn}$ : $Vv\theta_n$ $$\text{HORIZONTAL CORRELATION VALUE} = \frac{1}{n}\sum_{i=1}^{n} Vh\theta i$$

$$\text{VERTICAL CORRELATION VALUE} = \frac{1}{n}\sum_{i=1}^{n} Vv\theta i$$

VEHICLE CONTROLLER

CROSS REFERENCE TO RELATED APPLICATION

This application is based on and claims the benefit of priority of Japanese Patent Application No. 2005-179727 filed on Jun. 20, 2005, and Japanese Patent Application No. 2006-102398 filed on Apr. 3, 2006, the disclosure of which are incorporated herein by reference.

FIELD OF THE INVENTION

The present invention generally relates to a vehicle controller for controlling a vehicle.

BACKGROUND OF THE INVENTION

A map matching process in a navigation system basically estimates a position of a subject vehicle by, for example, acquiring a position data from a GPS satellite and combining the position data with additional data from a gyro and a speed sensor, and then determines the position of the subject vehicle by matching an estimated position to road data in a road map database. In this case, the matching process suffers from closely located roads in a small area or errors of sensing devices in terms of correctness and accuracy. That is, the current position of the vehicle may possibly be wrongly determined. In addition, the wrongly determined current position may affect a condition of vehicle control that uses current position data for suitably controlling the vehicle. The wrongly determined control condition may causes uncomfortableness, uncertainty or the like for a user of the vehicle.

A technique disclosed in Japanese Patent Document JP-A-2002-254980 uses map matching reliability index for evaluating accuracy of a vehicle position that is determined by using the map matching process, and controls a front light of the vehicle based on the evaluation of the positional accuracy. The reliability index has a predetermined set of ratings, for example, for determining reliability of map matching situations such as a turn case, a curve case, an off-the-route case or the like at an intersection, a branch, a corner or other points in a road. The reliability index has higher values in the situations where the current position of the vehicle is modified based on the estimated position of the vehicle. That is, the reliability index increases when the current position of the vehicle in the map is modified based on the estimation.

On the other hand, the road on the map data determined by using the map matching process has an increased possibility of errors when, for example, two roads starting from an intersection make a very small angle between them. That is, the vehicle position on the map just after passing the intersection may very well be wrong. Therefore, determining the reliability of the map matching process by utilizing the map data that specifies the two adjacent roads before passing the intersection is effective and useful for avoiding the erroneous control of the vehicle or the like.

However, the technique described above does not include consideration regarding a prior determination of erroneous map matching, that is, there is no consideration of a possibility of errors in the map matching.

SUMMARY OF THE INVENTION

In view of the above-described and other problems, the present disclosure provides a vehicle position detector and a vehicle controller that cooperatively control the vehicle based on a predicted level of certainty regarding a positional accuracy of the vehicle.

The vehicle position detector for use in a vehicle of the present disclosure includes a position detector, a map data storage, a map matching processor, a junction detector, a similarity calculator and an evaluation processor for the purpose of determining accuracy level evaluation of an adjustment of a current position of the vehicle. The vehicle position detector utilizes the above-described parts for detecting the current position of the vehicle, storing map data, and making adjustment on the detected current position in the map data. Then, the vehicle position detector determines whether a road to be traveled along by the vehicle has a junction, an intersection or the like, and calculates similarity index of each of the roads that starts at the junction portion of the road before the vehicle reaches the junction portion. Finally, the vehicle position detector predictably evaluates the position of the vehicle in each of the roads that extend from the junction portion. In this manner, the vehicle position detector predicts the possibility of erroneous determination of the current position of the vehicle in each of the roads before the vehicle actually travels along the roads.

In another aspect of the disclosure, the vehicle position detector utilizes a direction and/or an incline of the road stored in the map data for the calculation of the similarity index of the road. The similarity index is calculated as difference of the direction and/or the incline of each road.

In yet another aspect of the disclosure, the vehicle position detector includes a vector processor for converting the road into a series of vectors for further evaluation. That is, the similarity index is calculated based on each of the series of the vectors for more detailed evaluation.

In still yet another aspect of the disclosure, the vehicle position detector includes a threshold storage that stores a threshold of the similarity index and the accuracy level evaluation. In this manner, the evaluation processor determines the accuracy level evaluation based on the threshold of the similarity index.

In still yet another aspect of the disclosure, the vehicle controller having the above-described vehicle position detector includes a vehicle control units for controlling the vehicle based on the accuracy level evaluation. In this manner, the vehicle control unit suitably controls the vehicle based on the output of the accuracy level evaluation.

In still yet another aspect of the disclosure, the vehicle controller includes a plurality of the vehicle control units for controlling the vehicle. In each of the vehicle control units, a control level determination unit is implemented for determining the threshold of a control level regarding a predetermined type control of the vehicle. The vehicle control unit compares the control level and the accuracy level evaluation for suitably executing the predetermined type control. In this manner, the vehicle controller suitably controls each of the predetermined type controls controlled by the vehicle control unit.

In still yet another aspect of the disclosure, the vehicle controller acquires a certainty level evaluation of a road to be traveled along by the vehicle, and controls the vehicle based on the acquired evaluation by using the vehicle control unit. In this manner, the vehicle controller suitably predicts the evaluation, i.e., the degree of certainty of traveling on a certain road after passing a junction or the like, for appropriately control the vehicle. In addition, the vehicle controller may include a plurality of the vehicle control units for cooperative control of the vehicle based on the comparison between the control level threshold and the accuracy level evaluation or similar indices.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. Like parts have like numbers in each of the embodiments.

A vehicle position detector of the present disclosure is described as a function of a navigation system in a vehicle.

Figure 1:
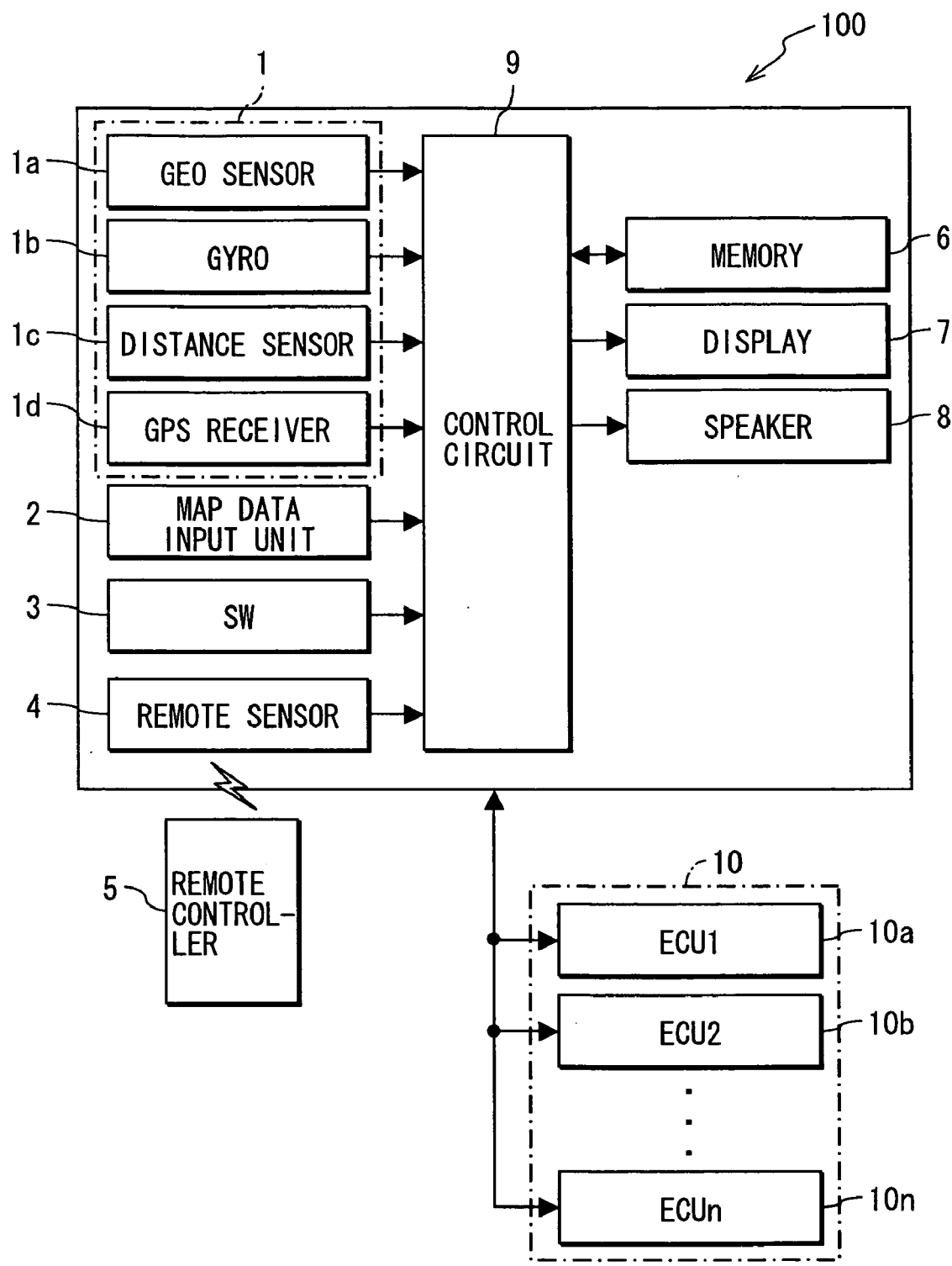
FIG. 1 shows a block diagram of a car navigation system in an embodiment of the present invention.

FIG. 1 shows a block diagram of a car navigation system 100 in an embodiment of the present invention. The navigation system 100 includes a position detector 1, a map data input unit 2, operation switches 3, a remote controller sensor 4, a remote controller 5, an external memory 6, a display 7, a speaker 8, and a control circuit 9. The navigation system 100 is connected to ECUs 10a to 10n (n pieces of ECUs). Those ECUs, i.e., ECUs 10a, 10b, to 10n, are represented as a group of ECUs 10.

The control circuit 9 is a computer of well-known type, and includes a CPU, a ROM, a RAM, an I/O and a bus line for interconnection between these devices (not shown in the figure). The ROM stores a program for execution in the navigation system 100. The program in the ROM controls processes executed in the CPU or in other devices.

The position detector 1 includes a plurality of well-known type sensors such as a geomagnetism sensor 1a, a gyroscope 1b, a distance sensor 1c, and a Global Positioning System (GPS) receiver 1d. These sensors are complementarily used for interactive compensation of errors of respectively different natures. These sensors may selectively be used based on the accuracy of the output, and a steering rotation sensor, a speed sensor or the like (not shown in the figure) may additionally be utilized.

The map data input unit 2 is used to input map data such as road network data, index data, drawing data or the like into the navigation system 100 under instructions from the control circuit 9. These data are provided in various kinds of memory medium such as a CD-ROM, a DVD-ROM as well as a writable medium such as a memory card, a hard disk or the like.

Next, links and nodes in the road network data are described. Links and nodes are defined as a geometrical element with two points attached on both ends of the element, and the node corresponds to a crossing, a branch point or the like of a road. Roads in a real world are geometrically represented as a combination of the links and nodes. Link data of each road includes a link ID, a link length, coordinates (e.g., latitude and longitude) of nodes on both ends, i.e., a start point and an end point, road type (interstate, state road, local road, or the like), road width, the number of lanes and the like.

Node data of each node includes a node ID, node coordinates (e.g., latitude and longitude), a node incline, connecting link IDs for designating all of the links that share the node as an end point, a link type of the connecting link that specifies the link as an inbound or an outbound relative to the node, and a node attribute that designates a node type such as an intersection, a branch point or the like.

The operation switches 3 are, for example, disposed as touch switches or mechanical switches on the display 7, and are used for inputting various kinds of instructions. The instruction may include a map image scroll instruction, a text input instruction or the like.

The external memory 6 is a memory medium of read/write capability for storing/retrieving information. The memory 6 stores map data or the like that is used for process in the navigation system 100.

The display 7 is, for example, a liquid crystal display or the like, and displays a position mark at a current position of the vehicle derived from the position detector 1 on a map that is generated by using the map data inputted from the map data input unit 2.

The speaker 8 outputs guidance voice for navigating a user or a driver of the vehicle, warning sound for calling attention of the driver or the like.

The current position of the vehicle on the map is determined in the following manner. That is, the current position is temporarily calculated based on information from the geomagnetism sensor 1a, the gyroscope 1b, the distance sensor 1c, and the Global Positioning System (GPS) receiver 1d. Then, the temporary calculation of the current position is matched with the map data retrieved by the map data input unit 2 for determining the current position of the vehicle on the map. The process for determining the position of the vehicle on the map is called "map matching" process. The position of the vehicle is suitably adjusted to the road on the map by the map matching process. The map matching process in executed in the control circuit 9.

The navigation system 100 has a capability of a route navigation function that automatically calculates optimum routes from a start point or the current position to a destination for displaying a guidance on the display 7 when the start point and the destination are specified by the user. The start point and the destination are specified by using the operation switches 3 and the remote controller 5 in connection with the remote controller sensor 4.

The ECUs 10 include, for example, an air-conditioner ECU for controlling an air conditioner, an engine ECU for controlling an engine, and a body ECU for controlling a front lighting and/or suspensions. Each of the ECUs 10 receives certainty level information from the navigation system 100 for determining positional accuracy of the current position of the vehicle or currently traveling road where the current position of the vehicle is located. Each of the ECUs 10 utilizes the certainty level information for providing controls. In this manner, based on the certainty level information, each of the ECUs 10 determines whether the controls from each of the ECU should be provided.

More practically, each of the ECUs 10 provides the controls in the following manner. That is, the ECUs 10a to 10n respectively store a specific threshold for control provision from each of the ECUs 10. The threshold stored in each of the ECUs 10 is compared with the certainty level information from the navigation system 100. Comparison result is reflected on the control provided by each of the ECUs 10. That is, whether the control should be provided or level of the control is determined based on the comparison result.

Values of the threshold may be determined in the following manner. That is, the threshold values for various situations may vary from low to high in terms of suitable control of the situation. In the present embodiment, the threshold values of high, middle, and low level are described as examples of illustration purpose.

A high threshold value may be applied to situations that demand increased reliability for the provision of the control such as adaptive front lighting for adaptively controlling direction of head lights according to road shape, curve speed limiting for suppressing vehicle speed in a curved road, and cooperative gear shifting for predictably controlling automatic transmission in accordance with the road shape and/or the incline. Provision of the control in those situation based on an inaccurate position of the vehicle may lead to disagreement of vehicle behavior to the situation involved. In other words, safety related matter in vehicle control requires higher reliability, thereby having to be based on accurate information in terms of suitability of the vehicle control to the specific situation. Therefore, the ECUs 10 for the safety related control have to use high threshold values for control provision.

Threshold values of middle range may be applied to situations that require control of stability of traveling or similar attributes. That is, variable suspension control or variable dumper control may be provided based on the middle level threshold, because the ECUs 10 having the middle level threshold are not directly involved in safety related matter of the vehicle. Therefore, the ECUs 10 for controlling the traveling stability may use the middle level threshold value.

Threshold values of lower range may be applied to situations such as opening of side windows in the proximity of a railroad crossing, automatic ventilation switching between inner circulation mode and outer air introduction mode before and after entering a tunnel, automatic TV/radio channel selection according to administrative areas, and automatic CD/DVD entertainment provision from audio/navigation system based on an architectural environment of the vehicle. In those situations, the ECUs 10 are not involved in safety related matter of the vehicle. In other words, comfort of occupants in the vehicle does not relates to the accuracy level of the current position of the vehicle. Therefore, the ECUs 10 in charge of the control of those functions may have the lower threshold values for providing the control.

Figure 2:
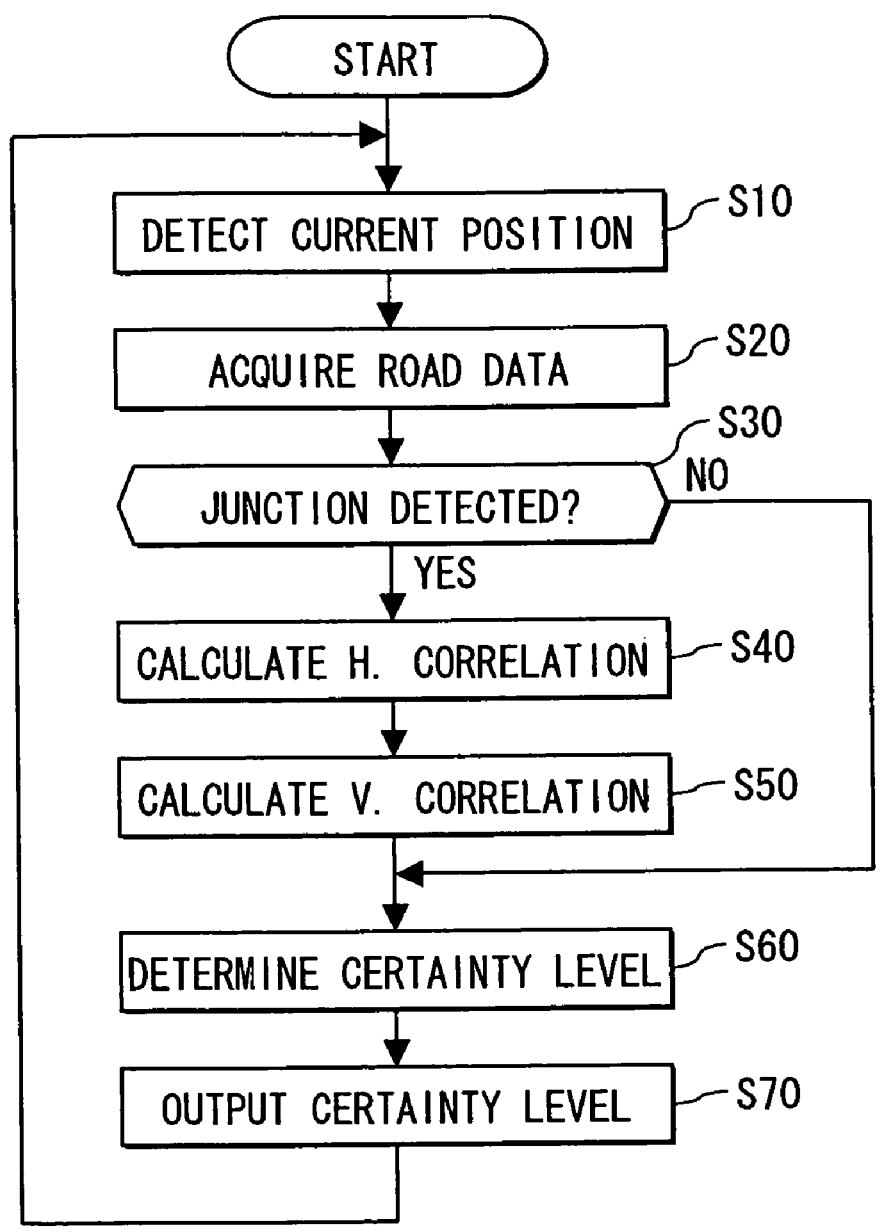
FIG. 2 shows a flowchart of a process for calculating similarity index of a front road.

The certainty level determination process is described with reference to a flowchart. FIG. 2 shows a flowchart of a process for calculating certainty level of a selection of a front road. The process is executed in the control unit 9.

In step S10, the process detects a current position of the vehicle in sensor information from the position detector 1.

Figure 3:
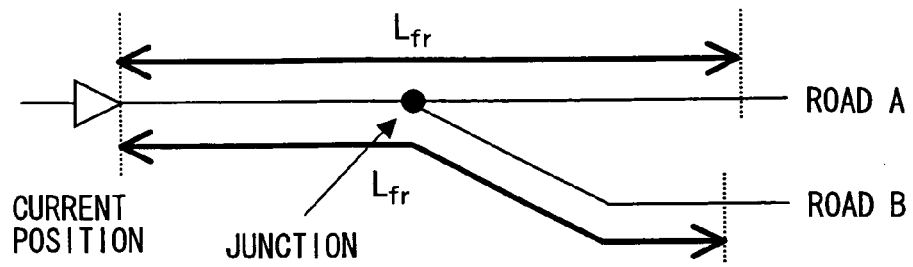
FIG. 3 shows an illustration of road length from a current position of a vehicle.

In step S20, the process acquires road data of a front portion of the traveling road, i.e., a portion of a road ahead of the vehicle, by map matching. The map matching is based on the current position of the vehicle detected in step S10. The road data may cover a portion of the road in a predetermined distance (Lfr) from the vehicle. The distance Lfr is called as "along-the-road distance" and is shown in FIG. 3.

In step S30, the process determines whether a junction exists ahead of the vehicle. That is, the process determines whether the currently traveling road forks in two or more directions. The process proceeds to step S40 when the road forks (step S30:YES), and the process proceeds to step S60 when the road does not fork (step S30:NO).

In steps S40 and S50, the process calculates similarity index of plural roads that fork and extend from the junction. In these steps, the plural roads ahead of the junction are examined in terms of similarity of shapes and/or inclines. That is, in step S40, coordinates of the start node and end node of the link in the road data are used to calculate horizontal correlation values based on the difference of direction of each road ahead of the junction. In step S50, the difference of incline of each road ahead of the junction are calculated as vertical correlation values in the same manner. The calculation of the horizontal/vertical correlation is described more in detail with reference to FIGS. 4A and 4B.

Figure 4A:
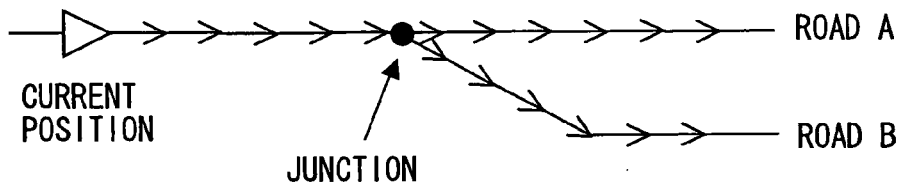
FIGS. 4A and 4B show an illustration and equations of correlation values in horizontal and vertical directions.
Figure 4B:
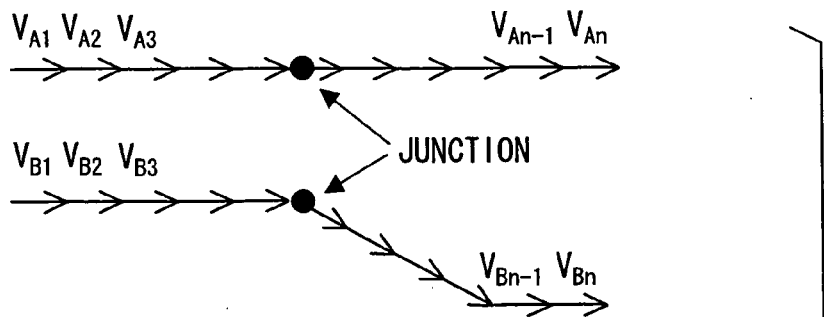

In FIG. 4A, a road A and a road B extend from the junction ahead of the vehicle. The junction may be set as a start point of a series of vectors VA1, VA2, and so on. The start point of the series of the vectors may be the current position of the vehicle. In both cases, the road A ahead of the vehicle represented by the series of the vectors VA1 to VAn, and the road B is divided into the series of vectors VB1 to VBn.

The difference of each of the vectors is added and averaged in step S40 after the roads A and B are divided into the series of vectors. That is, the difference of each of the vectors VAn and VBn is calculated as a horizontal correlation value Vhθn, and average of the Vhθn is represented by an equation 1 in the following.

$$\text{Horizontal correlation value} = (1/n)\sum_{i=1}^{n} Vh\theta i \qquad \text{[Equation 1]}$$

Further, in step S50, the difference of each of the vectors VAn and VBn is calculated as a vertical correlation value Vvθn, and average of the Vvθn is represented by an equation 2 in the following.

$$\text{Vertical correlation value} = (1/n)\sum_{i=1}^{n} Vv\theta i \qquad \text{[Equation 2]}$$

In this manner, the similarity of the roads A and the road B can be evaluated as correlation values based on the difference of directions and inclines as horizontal/vertical factors of the vector representation.

In step S60, the process determines certainty level in the map matching regarding the position of the vehicle and/or the road ahead of the junction based on the correlation values derived from those equations. The certainty level is determined by, for example, referring to a relationship table that defines relationship between the certainty levels and the horizontal/vertical correlation values in the external memory 6 or the like. In this manner, the road and the vehicle position ahead of the junction matched by the map matching are predictably evaluated for suitably providing the required control by employing the ECUs 10. In addition, certainty level in the map matching after the negative branch in step S30 may be determined to be in high level, because difference of vectors is minimum when there is no junction in the road ahead.

In step S70, the process outputs the certainty level to the ECUs 10. The process returns to step S10 after outputting the certainty level for iterative execution of the process.

The navigation system 100 in the present disclosure determines certainty level of the position of the vehicle and/or the road in the map matching for a portion of the road ahead of the junction based on the correlation value calculated for each the roads by analyzing the directions and/or inclines of the roads before the vehicle actually reaches the junction. Therefore, the navigation system 100 can evaluate or determine the possibility of errors in the map matching for the portion of the road ahead of the junction beforehand. That is, the possibility of the erroneous determination that the vehicle is traveling on the road A when the vehicle actually travels on the road B is predicted beforehand by the navigation system 100. In this manner, the ECUs 10 on the vehicle provide controls for suitably controlling the vehicle based on the comparison between the certainty level of the map matching and the threshold for control provision in each of the ECUs 10.

Although the present invention has been fully described in connection with the preferred embodiment thereof with reference to the accompanying drawings, it is to be noted that various changes and modifications will become apparent to those skilled in the art.

For example, correlation value of the horizontal and vertical direction may be variably changed based on the predicted error range in the map matching and/or accumulated sample data in the sensors of the position detector 1.

Further, in step S30 in the present embodiment, the junction may be replaced with an intersection or the like, because the intersection and the junction may present a similar situation when the angle between two outbound roads from the intersection is very small.

Furthermore, the difference of the direction and/or the incline of each vector used in steps S40 and S50 may directly be evaluated instead of evaluating the average of the differences.

Such changes and modifications are to be understood as being within the scope of the present invention as defined by the appended claims.

What is claimed is:

1. A vehicle position detector for use in a vehicle comprising:
   a position detector for detecting a current position of the vehicle;
   a map data storage for storing map data including description of roads on a map;
   a map matching processor for making adjustment of the current position of the vehicle based on the map data;
   a junction detector for finding a junction having at least two outbound roads extending therefrom based on the map data;
   a similarity calculator for calculating a similarity index of the at least two outbound roads from the junction detected by the junction detector; and
   an evaluation processor for evaluating the adjustment of the current position of the vehicle made by the map matching processor, wherein
      the map matching processor utilizes the current position of the vehicle detected by the position detector,
      the junction detector detects the junction to which the vehicle is going to enter,
      the similarity calculator calculates the similarity index of the at least two outbound roads based on the map data when the junction detector finds the junction having at least two outbound roads,
      the evaluation processor outputs a prospective accuracy level evaluation of the adjustment of the current position of the vehicle for the at least two outbound roads based on the similarity index before the vehicle reaches the junction, and
      the vehicle position detector is coupled to a vehicle controller comprising a vehicle control unit for controlling a vehicle based on the prospective accuracy level evaluation outputted from the evaluation processor.

2. The vehicle position detector as in claim 1, wherein
   the map data stored in the map data storage includes at least one of a direction of the road and an incline of the road, and
   the similarity calculator uses at least one of difference of the direction between the at least two outbound roads and difference of the incline between the at least two outbound roads as the similarity index.

3. The vehicle position detector as in claim 2 further comprising:
   a vector processor for converting each of the at least two outbound roads in the map data into a series of vectors starting at a start point, wherein
      each vector in the series of the vectors has a predetermined length, and
      the similarity calculator uses at least one of accumulative differences in the series of the vectors and accumulative differences in the series of the vectors as the similarity index.

4. The vehicle position detector as in claim 1 further comprising:
   a threshold storage for storing correlation between a threshold of the similarity index and the prospective accuracy level evaluation, wherein
      the evaluation processor uses the threshold stored in the threshold storage for determining the prospective accuracy level evaluation.

5. The vehicle position detector as in claim 1, wherein
   the vehicle controller comprises a plurality of the vehicle control units used for controlling the vehicle,
   each of the vehicle control units includes a control level determination unit for determining a threshold of the control level of a predetermined type control of the vehicle, and
   the vehicle control unit compares the threshold of the control level of the predetermined type control and the prospective accuracy level evaluation for determining at least one of execution and the control level of the predetermined type control.

* * * * *